(12) United States Patent
Zhao

(10) Patent No.: US 7,801,326 B2
(45) Date of Patent: Sep. 21, 2010

(54) DIGITAL WATERMARK AND FILM MARK

(75) Inventor: Jian Zhao, La Canada, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 949 days.

(21) Appl. No.: 11/639,704

(22) Filed: Dec. 15, 2006

(65) Prior Publication Data

US 2007/0277039 A1 Nov. 29, 2007

Related U.S. Application Data

(60) Provisional application No. 60/753,248, filed on Dec. 22, 2005.

(51) Int. Cl.
*H04K 1/00* (2006.01)

(52) U.S. Cl. ....................... 382/100; 713/176
(58) Field of Classification Search ............... 382/100, 382/232; 713/176; 380/210, 287
See application file for complete search history.

(56) References Cited

U.S. PATENT DOCUMENTS

| 4,025,851 | A | * | 5/1977 | Haselwood et al. | ............ 325/31 |
| 6,049,627 | A | * | 4/2000 | Becker et al. | ............... 382/181 |
| 2005/0193205 | A1 | * | 9/2005 | Jacobs et al. | ................ 713/176 |

* cited by examiner

*Primary Examiner*—Andrew W Johns
(74) *Attorney, Agent, or Firm*—Robert D. Shedd; Joseph J. Opalach; Catherine A. Cooper

(57) ABSTRACT

A method and system are described for inserting a watermark, including receiving partially encrypted or transformed content, receiving a watermark unit and replacing directly an unencrypted and untransformed portion of the partially encrypted or transformed content with an alternative value, wherein the alternative value has embedded therein watermark signals. Also described are a method and system for watermark detection, including receiving a watermark unit, receiving digital media content, wherein a portion of the digital media content was watermarked, retrieving a plurality of coefficient values from the watermarked content and retrieving bit values of the watermark from the coefficient values.

24 Claims, 2 Drawing Sheets

ONE WATERMARK UNIT (WU):
P: STARTING POSITION
L: LENGTH (IN BITS)
C: GLOBAL POSITIONS OF COEFFICIENTS IN THE ENCODED CONTENT
V: ORIGINAL VALUE (OPTIONAL)
V1, ... Vn: ALTERNATIVE VALUES (n>=1)

I-Frame (not transformed but watermark preprocessed)   I-Frame (transformed and watermark preprocessed)   I-Frame (transformed and watermark preprocessed)

ENCODED CONTENT WITH WUs

DIGITAL WATERMARK AND FILM MARK

This application claims the benefit of Provisional Application No. 60/753,248, filed 22 Dec. 2005.

FIELD OF THE INVENTION

The invention relates to the field of digital content security and in particular, to content scrambling and digital watermarking.

BACKGROUND OF THE INVENTION

Encoded content requires a "decoding" process in order to use the content. Some examples of encoded content include MPEG-1 MPEG-2 H.264/AVC, WMA, MPEG4, JPEG2000, MP3, PDF, Windows Word, Postscript, etc., and their encrypted versions.

The prior art methods for watermarking encoded content comply with the media transform with many restrictions such as no watermarking in some I-frames or no watermark in the first ten seconds of the digital media. The prior art methods also do not apply media transforms and watermarking to every I-frame in order to support "trick play" such as fast forwarding. Media transform is a process to replace sets of bits in the encoded content with other sets of bits. In some cases, the second set of bits represents a better quality of the content than the first set of bits. As a result, the media transform process improves the quality of the content. Furthermore, in some cases the second set of bits may contain additional digital watermark signals and, thus, such process may introduce digital watermarks.

If no media transform occurs in some part of an encoded content, for example, in one out of every four frames of video I-frame data, it unduly restricts the space for watermarking resulting in embedding less watermark payload and increasing synchronization costs during watermark detection. Furthermore, such restriction may cause significant portions of the content to be unwatermarked/unprotected. It is clear that there needs to be a method for protecting digital content while preserving specialty playback device operations, such as "trick play".

SUMMARY OF THE INVENTION

The present invention watermarks encoded content by embedding watermarks in selected locations in the encoded content without restrictions on the locations that are available for watermarking and without leaving meaningful portions of content unwatermarked. This is accomplished by replacing original values in the encoded content by their alternative values. Each original value may have one or more alternative values and each alternative value contains a watermark signal. Moreover, watermarks can be removed by replacing the alternative values with the original value, or be replaced by substituting one alternative value with another alternative value.

Each alternative value contains watermark signals. By selecting one of the alternative values to substitute for the original value in the corresponding locations in the encoded content, these watermark signals, either together with other watermark signals at other positions within the encoded content or by themselves, can have one or more units of information embedded. A unit of information consists of one or more bits. By not restricting the I-frames that can be watermarked, there can be more units of information (forensic marking payloads) that can be embedded in the encoded content. Watermark detection is easier because there is no need to identify the skipped I-frames and synchronize the frames in the baseband (uncompressed) or encoded video in the watermark detection process. Moreover, the task of watermark embedding is easier during the content authoring process. The playback devices, including specialty playback operations, are also easier to implement.

A localized encryption allows for a correspondence between the clear text and cipher text. One category of encryption, which makes localized encryption possible, is selective encryption or partial encryption. Instead of treating content (audio or video) as binary data streams (also called "native encryption"), selective encryption methods "understand" the content syntax structure (e.g. MPEG-2 structure) and only selectively encrypt some parts of the content. Selective encryption may occur after compression. Encrypted content must not have commercial value in terms of quality if part of the encrypted content is viewable.

Taking MPEG-2 content as an example, a simple selective algorithm encrypts only the I-frames. The selectively encrypted MPEG may be a valid MPEG stream. Although P and B frames in MPEG-2 are not valuable without knowledge of the corresponding I-frames, large portions of MPEG video are still visible (viewable) because of inter-frame correlation and mainly from unencrypted I-blocks in the P and B frames.

A method and system are described for inserting a watermark, including receiving partially encrypted or transformed content, receiving a watermark unit and replacing directly an unencrypted and untransformed portion of the partially encrypted or transformed content with an alternative value, wherein the alternative value has embedded therein watermark signals. Also described are a method and system for inserting a watermark, including receiving partially encrypted or transformed content, receiving a watermark unit, receiving a sequence of bits, wherein the sequence of bits includes watermark payload information and performing one of replacing directly an unencrypted and untransformed portion of the partially encrypted or transformed content with an alternative value, and leaving unchanged said portion of said partially encrypted or transformed content, based on bit values of the sequence of bits of the watermark payload information and wherein the alternative value has embedded therein watermark signals. Further described are a method and system for watermark detection, including receiving a watermark unit, receiving digital media content, wherein a portion of the digital media content was watermarked, retrieving a plurality of coefficient values from said watermarked content and retrieving bit values of the watermark from the coefficient values.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
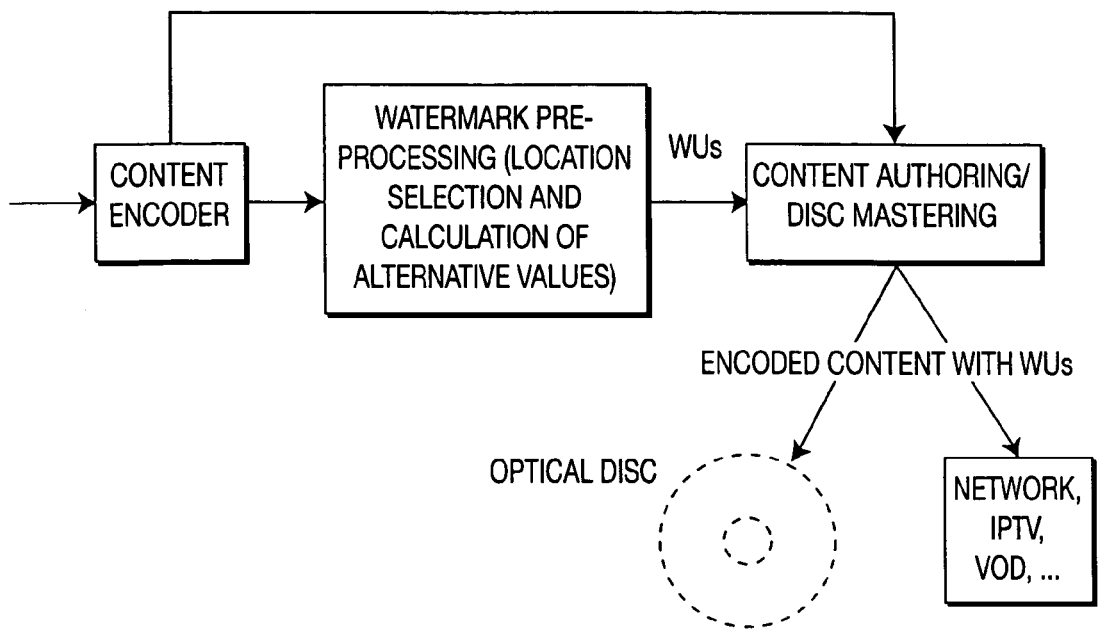
FIG. 1 is a block diagram showing the workflow for the pre-processing for watermark embedding in accordance with the principles of the present invention.

Watermarking encoded content can be divided into three separate steps:

Location selection, which is the selection of the position where the value in the encoded content can be replaced by alternative values containing watermark signals.

Calculation of alternative values, which is the determination of the alternative values so that the alternative values have the same number of bits as the value the alternative values are to replace in the encoded content and such substitution will not cause perceptual changes to the content. Moreover, these alternative values contain watermark signals.

Watermark embedding/insertion, which is the actual replacement of the value in the encoded content by one of the alternative values.

Forensic watermarking can be pre-processed during content authoring to generate alternative values containing watermarking signals. These alternative values will be later used to replace clearly defined parts of the encoded content to embed watermark information. Specifically, the present invention is directed to a method which applies watermarks to each I-frame of a unit of digital media content including optionally the first ten seconds of the digital media content.

As a result of the pre-processing, a set of watermark units (WUs) are produced. WUs contain all information for actually embedding/inserting a watermark. The watermark pre-processor takes encoded content as the input and a watermark key, and outputs a sequence of watermark units. In the case where only one alternative value is generated for each WU, a watermark payload may become an additional input to the pre-processor. These watermark units are integrated into the final content as meta data of the encoded content, as a separate channel multiplexed with the content, as steganographic data hidden in the syntax elements or in the content, or as a separate file stored in the physical media (optical disc, tape, hard drive, etc.) or transmitted over a network (TCP/IP, satellite, etc.). The watermark payload information is embedded by selecting from among the alternative values in WUs. A WU has at least one alternative value.

The watermark payload is typically received in the third step "Watermark Insertion". It can be stored in or calculated by a component external to the watermarking system. The watermark payload information is typically an identifier uniquely identifying the recipient, playback device (manufacturer, model and/or serial number), or date and time of the playback of the content. The difference between the original value, V, and its alternative values may be stored in WUs to potentially reduce the size of WUs. WUs can be further compressed.

It is important that the WUs are protected against unauthorized access or modification, because with this information not only the watermarking system is vulnerable to various attacks but also it is easy for a hacker to insert fake watermarks, or alter or remove existing watermarks. If the WUs are stored and transmitted as steganographic (watermarking) data, the access can be controlled by a watermarking key.

As indicated earlier, the first and second steps can be performed by a pre-processor. Thus, prior to the third step the encoded content is not watermarked. The third step performs the watermark embedding by replacing some values in the encoded content with the alternative values specified in WUs. The WUs specify where the watermark signals (in alternative values) are embedded and what the possible watermark signals can be in these positions by selecting the appropriate alternative values.

Specifically, the present invention is directed to a method for insertion of watermarks in every I-frame of a unit of digital media content including optionally the first ten seconds of the unit of digital media content. This entails neither applying media transform nor scrambling to every fourth I-frame data in MPEG-2 encoded content. This means that every fourth I-frame must have valid and correct audio and video data. That is, there may be no format corruption and no perceptual artifacts are permitted. In one embodiment the first ten seconds of a unit of digital media content are not used for watermarking and in an alternative embodiment the first ten seconds of the unit of digital media content are also watermarked.

Figure 2:
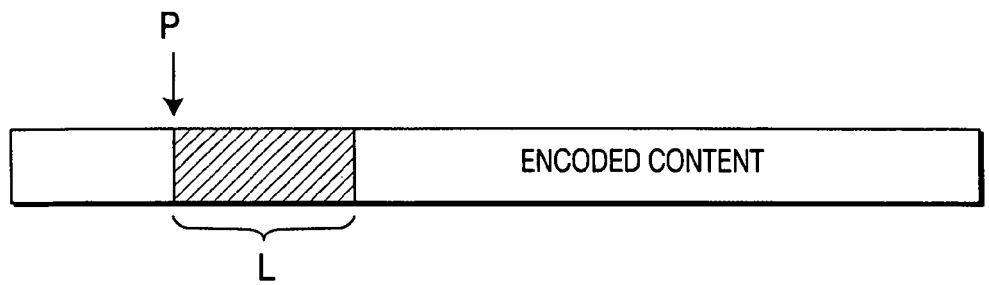
FIG. 2 depicts a watermark unit (U) of the present invention.

FIG. 1 is a block diagram showing the workflow for pre-processing of encoded content to generate WUs. FIG. 2 depicts a watermark unit in accordance with the principles of the present invention. Each WU is described by a vector (P, L, C, {V}, V1, V2, ... Vn) where P is the position of the original value V that may be replaced in the future by an alternative value in the encoded content, L is the number of bits occupied by the original value V in the encoded content starting at P, C is a set of global positions of the coefficients (for example, the DCT or wavelet quantized coefficients) that are encoded in the L bits (in encoded content) with an entropy coding method. Entropy coding such as a Huffman coding is typically applied to the last stage of encoding to produce the encoded content. V1, V2, ... Vn are valid alternative values of V and each of such values contain a watermark signal. Each coefficient position is represented by c(ch,f,b,co) where ch is the channel index, f is the frame index, b is the block index, and co is the coefficient index within the block for a unit of video content. An alternative value is valid, if, when this value replaces the current value it maintains format compliance and there are no perceptual effects on the content. Moreover, V1, V2, ... Vn occupy L bits as V does in the encoded content. {V} indicates that the original value is optional in the embedding/insertion process. The original value may be required in the watermark removal processes.

An original value V may contain one or more coefficients in encoded form. When the WUs are generated, if the input is encoded content such as MPEG-2 or MPEG-4, the entropy coding, i.e. Variable Length Coding (VLC), first needs to be "undone" to access to coefficients, and then find the appropriate position and alternative values and store the original coefficient and these alternative values. An alternative value Vi may correspond to the same coefficients as V does, but in some cases Vi may correspond to more or less coefficients than V does.

Encoded content is pre-processed and alternative values containing watermark signals are generated. These alternative values will be later used to replace clearly defined parts of the encoded content. Although the existing watermarking systems can be applied to pre-processing (i.e. Step 1 and 2) and actual insertion (Step 3), new watermarking algorithms can be developed specially for this scheme.

During content authoring, encoded content can also be partially encrypted or transformed. Partially encrypted or transformed content ("transformed content") may be format corrupt or format compliant. If the transformed content is format corrupt, then the format of the transformed content is corrupt and it cannot be decoded and played without a reverse transformation, or it can be decoded and played with serious content quality degradation. If the transformed content is format compliant, then the transformed content retains its format but its quality is degraded without a corresponding reverse transformation.

After content is encoded, if it was further transformed or encrypted, some parts of the encoded content are usually required to remain in "clean" format (i.e. untransformed or unencrypted) in order to support special playback modes such as "trick play" mode (e.g. fast-forwarding, rewinding, . . . ) because the playback devices may not have sufficient resources to perform the reverse transformations and decryption.

The present invention allows a playback device to skip the reverse transformation operations on certain portions ("clean" portions that are not partially encrypted nor transformed) of encoded content but still perform the forensic marking by replacing the values of those portions that are skipped with alternative values defined in the watermark pre-processing stage. In such a case, the forensic marking can be applied before or after reverse transformations or decryption.

In order to do so, the portions of the encoded content that are used for special playback modes should be "playable" without transformation, i.e. they are either not encrypted, or not transformed with corrupted format.

MPEG-2 video is one example of encoded content. Trick play mode such as fast-speed forwarding or rewinding is usually supported by decoding and playing one I-frame in every N I-frames in a playback device. If the I-frames that are used for such trick plays require a reverse transformation or decryption, a playback device may not have enough sources (CPU, memory, etc.) to perform the required operations.

In an exemplary embodiment of the present invention, as a result of the limited resources of the playback devices, these I-frames are not transformed or encrypted in the content authoring but they are pre-processed for forensic marking.

In another embodiment, these I-frames are transformed during the content authoring in such a way that the transforms do not corrupt the MPEG-2 format (i.e. these transformed I-frame are valid) but cause the degradation of quality or cause special visual effects such as displaying additional texts, logos or other visual information. In this case, the playback devices are required to perform as much of the reverse transformation operation as possible depending on device's resources and/or the speed of trick plays. Thus, for a low-speed trick plays such as 2×, 4×, 8× fast-forwarding and rewinding, the devices may have sufficient resources to perform the reverse transformation. For a high-speed trick plays, no reverse transformations will be performed. As a result, for a low-speed trick plays, the original non-degraded video quality will be delivered. For a high-speed trick plays, the degraded quality will be delivered without any reverse transformations. In both low- and high-speed trick plays, the forensic marking is always applied to these I-frames.

Figure 3:
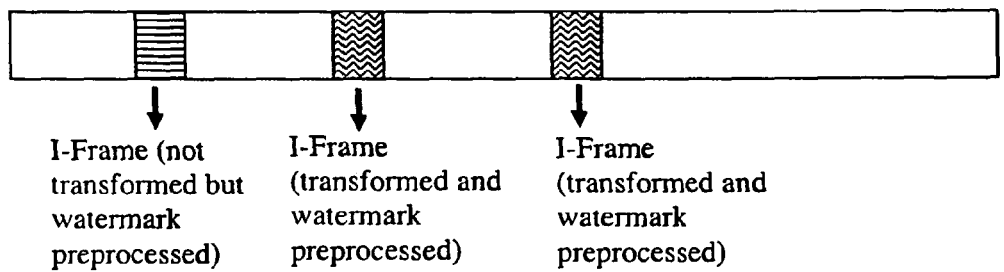
FIG. 3 depicts digital video content showing the I-frames in accordance with the principles of the present invention.

FIG. 3 depicts digital video content showing the I-frames in accordance with the principles of the present invention. In the first I-frame (indicated by horizontal lines) the data specified is not transformed but is watermark pre-processed. This I-frame is used for specialty operations such as "trick-play" modes. The next two I-frames (indicated by generally horizontal wavy lines) may be transformed and are watermark pre-processed. That is, every fourth I-frame is not transformed but all I-frames of a unit of digital media content except the first ten seconds in one embodiment and all I-frames including the first ten seconds of digital media content in an alternative embodiment are watermark pre-processed.

Figure 4:
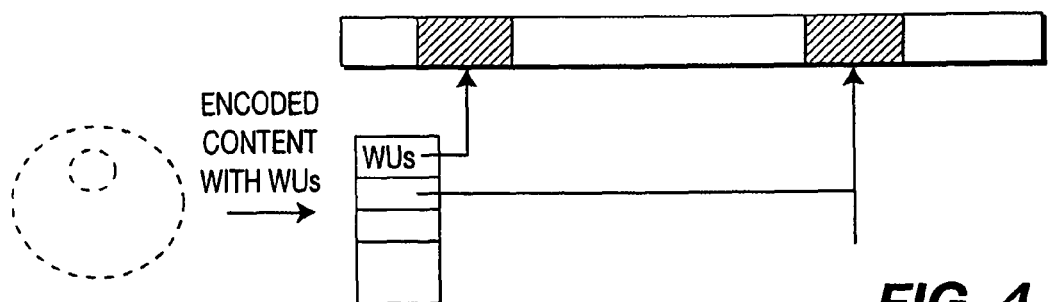
FIG. 4 is a block diagram of a playback device, which receives encoded content having watermark units embedded therein.

A watermark can be removed if WUs are known, by simply restoring the content to the original value V in each WU. To overwrite an existing watermark in the encoded content, one can simply select an appropriate value from V1, V2, . . . Vn in each WU according to the payload information to replace the value containing the existing watermark in the encoded content. A removable watermark is useful in some applications for supporting multi-generation watermarks. An example of multi-generation watermarks is to embed a forensic mark in each step of content post-production. To avoid accumulation of perceptual degradation potentially introduced by multiple watermarks, one may wish remove some or all previous watermarks before a new watermark is embedded. FIG. 4 shows an example of the watermark inserter in a playback device. The watermark inserter embeds a watermark by replacing some values in the encoded content received by the devices with the alternative values specified in WUs. A replaceable watermark can also be useful for switching the states of copy protection for copyrighted content. For example, for a unit of content with a watermark information indicating "copy once", after one copy is made one may wish to change the watermark information from "copy once" to "no copy". There are several approaches to avoid any potential conflict of multiple watermarks (i.e. interfere between multiple watermarks). One approach is to use a unique sub-band for each generation of watermarks. Another approach is to select WUs with the positions that are different from the previous watermarks.

By using every I-frame after the first ten seconds of digital media content in one embodiment and optionally every I-frame including the first ten seconds in an alternative embodiment the watermark inserter/embedder is less costly to design and manufacture. There are more places for watermark insertion making the digital media content more secure against leakage and unauthorized copying/duplication. Further, should there be unauthorized copying the detection process is easier to implement and less costly to design and manufacture since no I-frames are skipped.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

What is claimed is:

1. A method for inserting a digital watermark, said method comprising:
    receiving transformed digital content;
    receiving a watermark unit, the watermark unit being described by a vector, the vector comprising an alternative value for an original value of a portion of the transformed digital content and a set of global positions of coefficients; and
    replacing directly an unencrypted and untransformed portion of said transformed digital content with the alternative value, wherein said alternative value has embedded therein watermark signals.

2. The method according to claim 1, wherein the said portion includes at least one frame in said transformed digital content.

3. The method according to claim 1, wherein no replacement occurs during the first ten seconds of said transformed digital content.

4. The method according to claim 1, wherein transformed digital content is digital media content.

5. The method according to claim 4, wherein the digital media content is video content, a coefficient position comprising one of a position of a channel index, a frame index, and a block index within a block of the video content.

6. The method according to claim 1, the vector further comprising a position of the original value having a length in bits to be replaced by the alternative value for the original value in the portion of transformed digital content.

7. The method according to claim 1, further comprising outputting a sequence of received watermark units from the transformed digital content and a watermark key.

8. The method according to claim 1, the vector optionally comprising the original value.

9. A system for inserting a watermark, comprising:
    means for receiving transformed digital content;
    means for receiving a watermark unit, the watermark unit being described by a vector, the vector comprising an alternative value for an original value of a portion of the transformed digital content and a set of global positions of coefficients; and
    means for replacing directly a unencrypted and untransformed portion of said transformed digital content with the alternative value, wherein said alternative value has embedded therein watermark signals.

10. The system according to claim 9, wherein the said portion of said transformed digital content includes at least one frame in said transformed digital content.

11. The system according to claim 9, wherein no replacement occurs during the first ten seconds of said transformed digital content.

12. The method according to claim 9, wherein transformed digital content is digital media content.

13. The system according to claim 9, wherein the transformed digital content is digital video content, a coefficient position comprising one of a position of a channel index, a frame index, and a block index within a block of the digital video content.

14. The system according to claim 9, the vector further comprising a position of the original value having a length in bits to be replaced by the alternative value for the original value in the portion of transformed digital content.

15. The system according to claim 9, further comprising means for outputting a sequence of received watermark units from the transformed digital content and a watermark key.

16. The system according to claim 9, the vector optionally comprising the original value.

17. A method for inserting a watermark, said method comprising:
    receiving transformed digital content;
    receiving a watermark unit, the watermark unit being described by a vector, the vector comprising an alternative value for an original value of a portion of the transformed digital content and a set of global positions of coefficients;
    receiving a sequence of bits, wherein said sequence of bits comprises watermark payload information comprising alternative watermark unit values; and
    performing one of replacing directly a unencrypted and untransformed portion of said transformed digital content with the alternative value for the original value and of leaving unchanged said portion of said transformed digital content, based on bit values of said sequence of bits of said watermark payload information and wherein said alternative value for the original value has embedded therein watermark signals.

18. The method according to claim 17, wherein said portion of said transformed digital content includes at least one frame.

19. The method according to claim 17, wherein no replacement occurs during the first ten seconds of said transformed digital content.

20. The method according to claim 17, wherein transformed digital content is digital media content.

21. A system for inserting a watermark, comprising:
    means for receiving transformed digital content;
    means for receiving a watermark unit, the watermark unit being described by a vector, the vector comprising an alternative value for an original value of a portion of the transformed digital content and a set of global positions of coefficients;
    means for receiving a sequence of bits, wherein said sequence of bits comprises watermark payload information comprising alternative watermark unit values; and
    means for performing one of replacing directly a unencrypted and untransformed portion of said transformed digital content with the alternative value for the original value and of leaving unchanged said portion of said transformed content based on bit values of said sequence of bits of said watermark payload information and wherein said alternative value for the original value has embedded therein watermark signals.

22. The system according to claim 21, wherein said portion of said transformed digital content includes at least one frame.

23. The system according to claim 21, wherein no replacement occurs during the first ten seconds of said transformed digital content.

24. The system according to claim 21, wherein transformed digital content is digital media content.

* * * * *